(12) United States Patent
Kubota

(10) Patent No.: US 8,407,545 B2
(45) Date of Patent: Mar. 26, 2013

(54) COMMUNICATION DEVICE

(75) Inventor: Syuji Kubota, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 366 days.

(21) Appl. No.: 12/792,319

(22) Filed: Jun. 2, 2010

(65) Prior Publication Data

US 2010/0313094 A1     Dec. 9, 2010

(30) Foreign Application Priority Data

Jun. 4, 2009 (JP) ................................ 2009-135150

(51) Int. Cl.
*H04L 1/00* (2006.01)
(52) U.S. Cl. .................... 714/746; 714/755; 714/784
(58) Field of Classification Search .................. 714/746, 714/795, 755, 756, 784, 786, 702, 752, 749
See application file for complete search history.

(56) References Cited

U.S. PATENT DOCUMENTS

| | | | |
|---|---|---|---|
| 4,481,645 A | * | 11/1984 | Karabinis ..................... 375/285 |
| 5,204,682 A | * | 4/1993 | Beasley ........................ 342/117 |
| 7,035,341 B2 | | 4/2006 | Mohindra |
| 7,516,390 B2 | * | 4/2009 | Shen et al. .................... 714/755 |
| 7,779,338 B2 | * | 8/2010 | Altintas et al. ................ 714/795 |
| 2008/0159442 A1 | | 7/2008 | Tanabe et al. |

FOREIGN PATENT DOCUMENTS

| | | |
|---|---|---|
| CN | 101079863 A | 11/2007 |
| JP | 2006-197434 | 7/2006 |
| JP | 4261578 | 2/2009 |
| WO | WO 2009/039444 A1 | 3/2009 |

OTHER PUBLICATIONS

Office Action issued Jul. 30, 2012, in Chinese Patent Application No. 201010194888.9.

* cited by examiner

*Primary Examiner* — Fritz Alphonse
(74) *Attorney, Agent, or Firm* — Oblon, Spivak, McClelland, Maier & Neustadt, L.L.P.

(57) ABSTRACT

A communication device is provided with a partial Fourier transformation circuit that calculates a correction parameter for quadrature errors correction. The partial Fourier transformation circuit is programmed to calculate a single one of frequency bins.

8 Claims, 7 Drawing Sheets

FIG. 6A
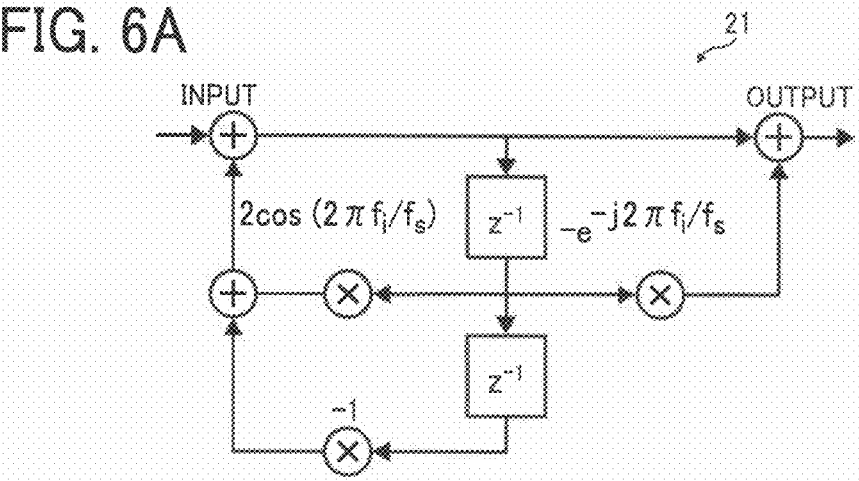
FIG. 6B
$$Hf_i(z) = \frac{1 - e^{-j2\pi f_i/f_s} z^{-1}}{1 - 2\cos\left(\frac{2\pi f_i}{f_s}\right) z^{-1} + z^{-2}}$$
FIG. 7
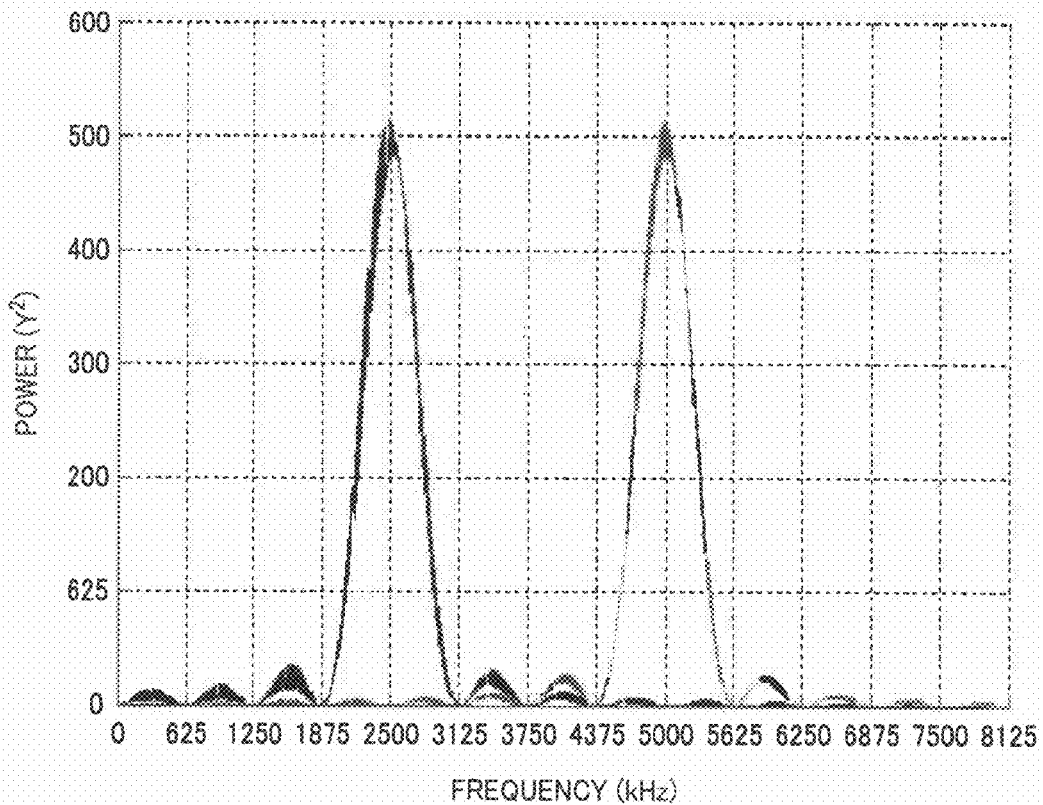

COMMUNICATION DEVICE

CROSS-REFERENCE TO RELATED APPLICATIONS

This patent application is based on and claims priority under 35 U.S.C. §119 to Japanese Patent Application No. 2009-135150, filed on Jun. 4, 2009, in the Japanese Patent Office, the disclosure of which is hereby incorporated herein by reference.

FIELD OF THE INVENTION

The present invention generally relates to a communication device, and more specifically to a communication device provided with a function to correct the IQ signal imbalance in quadrature modulation/demodulation.

BACKGROUND

In the field of wireless communication technology, a wide variety of products are used in offices and homes which implements, for example, wireless LAN communication according to the IEEE802.11 standards or wireless PAN communication according to the wireless USB standard. The above-described wireless communication technology uses a carrier communication method. Wired communication technology such as Asymmetric Digital Subscriber line (ADSL) also uses the carrier communication method. In the carrier communication method of wired or wireless communication technology, quadrature or orthogonal modulation/demodulation is widely used, especially for multi-bit modulation/demodulation.

For descriptive purposes, the following example describes a case of communication using the 802.11 wireless LAN standard, which utilizes a digital modulation method such as Orthogonal Frequency Division Multiplexing (OFDM).

At a transmitter side, a primary modulation wave having a plurality of subcarriers is generated based on a baseband signal. The baseband in-phase signal ("I signal") and quadrature-phase signal ("Q signal") are upconverted to a radio frequency (RF) band through a quadrature modulator. More specifically, the quadrature modulator mixes the I and Q signals ("I/Q signals") respectively with the in-phase (0-degree) and quadrature-phase (90-degree out of phase) components of a local signal output from a local oscillator, and sums the I and Q signals to generate a composite RF signal. The RF signal is then output through an amplifier or antenna to an air interface as an electric wave.

At a receiver side, the RF signal that is received, for example, through the antenna, is input to a filter in which the high frequency components are removed. The RF signal is then mixed with the in-phase and quadrature-phase components of the local signal, which are output from the local oscillator and amplified by a low noise amplifier (LNA), and output as the baseband I/Q signals.

As an alternative to converting directly from the RF signal to the baseband signal, the RF signal may be converted to an Intermediate Frequency (IF) signal before being converted to the baseband signal. Even in such case, the modulator or demodulator is provided with the function to upconvert or downconvert from or to the baseband signal, and the function to apply quadrature modulation or demodulation.

While the quadrature modulation may be performed by a digital circuit, an analog circuit is often used for quadrature modulation especially when the frequency is made higher. For example, the RF band used for wireless communication is often processed by an analog circuit, while the baseband is processed by a digital circuit.

When the digital circuit is used for quadrature modulation, it is not likely to have errors, for example, due to changes in temperature or manufacturing process. However, when the analog circuit is used for quadrature modulation, the quadrature errors may occur due to various environmental factors including, for example, amplitude error, phase error, or DC offset. Not only do quadrature errors arise in the quadrature modulator, but quadrature errors may be caused due to the delay time in transmitting the signals as the I/Q signals pass the baseband filters. Since quadrature errors may cause an error in communication, the quadrature errors need to be corrected.

While the quadrature errors caused in the quadrature modulation analog circuit may be corrected either by an analog circuit or a digital circuit, the digital circuit has been widely used as it is capable of suppressing the overall system cost.

FIGS. 1 and 2 each illustrate a digital circuit for correcting the quadrature errors such as the amplitude error, the phase error, or the DC offset of the I/Q signals.

The transmitter system of FIG. 1 includes a baseband (BB) digital circuit 100, a correction circuit 101 including an I gain control 101a, a Q gain control 101b, and an IQ phase control 101c, and a digital analog converter (DAC) 102. The BB circuit 100 generates I and Q signals which differ in phase by 90 degrees. The I signal output by the BB circuit 100 is multiplied by a gain correction coefficient as it passes the I gain control 101a, and further multiplied by a phase correction coefficient as it passes the IQ phase control 101c. The I signal is then added with the Q signal, and further added with the DC component of the Q signal to produce the corrected Q signal. The Q signal output by the BB circuit 100 is multiplied by a gain correction coefficient as it passes the Q gain control 101b, and further multiplied by a phase correction coefficient as it passes the IQ phase control 101c. The Q signal is then added with the I signal, and further added with the DC component of the I signal to produce the corrected I signal. The corrected I/Q signals are converted from digital to analog at the DAC 102 to be transmitted into air as an electric wave.

The receiver system of FIG. 2 includes the baseband (BB) digital circuit 100, a correction circuit 103 including an I gain control 103a, a Q gain control 103b, and an IQ phase control 103c, and an analog digital circuit (ADC) 104. Based on the data signal received from the outside through the antenna, the I/Q signals are generated and input to the ADC 104 for conversion from analog to digital. The I signal is added with the DC component of the I signal, and multiplied by a gain correction coefficient as it passes the I gain control 103a. The I signal is then multiplied by a phase correction coefficient as it passes the IQ phase control 103c, and added with the Q signal to produce the corrected Q signal. The Q signal is added with the DC component of the Q signal, and multiplied by a gain correction coefficient as it passes the Q gain control 103b. The Q signal is then multiplied by a phase correction coefficient as it passes the IQ phase control 103c, and added with the I signal to produce the corrected I signal. The corrected I/Q signals are input to the BB circuit 100.

In order to correct quadrature errors, the value of the circuit, or the correction coefficients used for correction, may be determined as follows. In the transmitter system of FIG. 1, the power envelope components are extracted from the RF signal obtained by orthogonally transforming the I/Q signals output by the BB circuit 100 to generate a power envelope signal. The power envelope signal is fed back to the digital circuit to correct the IQ quadrature errors. Assuming that the quadrature error components are introduced into the local signal generated at the transmitter system of FIG. 1 due to various errors such as IQ gain error, IQ phase error, or IQ DC offset, the power envelope signal has a tone at a frequency f2 that is twice a frequency f1 of a single tone of the local signal. Assuming that the DC offset component is introduced into the local signal due to the DC offset error, the frequency f1 of the tone of the local signal increases. Assuming that the IQ gain or phase error component is introduced into the local signal due to the IQ gain or phase error, the frequency f2 of the tone of the envelope signal increases. Based on the detected values of the frequency f1 and the frequency f2, the value of the digital correction circuit may be determined so as to minimize the values of the frequencies f1 and f2.

In the receiver system of FIG. 2, the signal having a value equal to the local signal used for modulation at the transmitter side is input. The I/Q signals, which are obtained by orthogonally transforming the received RF signal, are input to the BB circuit 100. Based on a comparison between the power of the local signal and the power of the I/Q signals, the IQ gain error may be estimated. Further, the average of the product sum of the I and Q components may be obtained so as to adjust the value of the circuit to minimize the phase errors. Assuming that there are IQ quadrature errors, the value of the circuit may be determined so as to minimize the image data signal components in a frequency domain. The value used for DC offset correction at the receiver system of FIG. 2 may be obtained by averaging the I/Q signals that are input over a predetermined time period.

As an alternative to the above-described digital circuit for correcting the quadrature errors, the quadrature errors may be corrected in different ways, for example, as described in U.S. Pat. No. 7,035,341, U.S. Patent Application Publication No. 2008/0159442, or Japanese Patent Application Publication No. 2008-167057.

Japanese Patent Application Publication No. 2008-167057 describes an apparatus and a method of correcting phase and amplitude distortion using a Fast Fourier Transform (FFT) circuit, which is generally provided in the OFDM modulation/demodulation circuit. While it is relatively easy to calculate the power of the single tone having the same frequency with the frequency bin obtained from the relationship between the FFT and sampling frequency using the FFT circuit, the FFT circuit that is generally provided in the baseband modulation/demodulation circuit may not have sufficient compensation power to allow correction of quadrature errors. In order to reduce the manufacturing cost and electric power consumption, the FFT circuit provided in the modulation/demodulation circuit is usually designed so as to have the minimum computation power that is sufficient for modulation/demodulation, which may be determined based on quantized noise obtained for secondary modulation. On the other hand, the computation power required for calculating the power of the image signal caused due to the quadrature errors should be set greater than the computation power that is required for modulation/demodulation. In order to increase the computation accuracy, a correction circuit may need to be provided in addition to the FFT circuit that is already provided in the modulation/demodulation circuit. However, providing the additional circuit will cause the overall circuit size to increase, thus increasing the manufacturing cost and electric power consumption.

SUMMARY

In view of the above, an aspect of the present invention is to provide a communication device provided with a partial Fourier transformation circuit capable of calculating a correction parameter for quadrature errors correction. With the partial Fourier transformation circuit, quadrature errors are corrected with the improved accuracy while keeping the circuit relatively small in size. The partial Fourier transformation circuit is programmed to calculate a single one of Fourier transformation frequency bins.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a circuit diagram illustrating a structure of a partial Fourier transformation circuit provided in the correction calculation circuit of FIG. 5;

FIG. 6B is a function of the partial Fourier transformation circuit of FIG. 6A;

FIG. 7 is an illustration for explaining frequency-power characteristics calculated by the partial Fourier transformation circuit of FIG. 6A;

Figure 1:
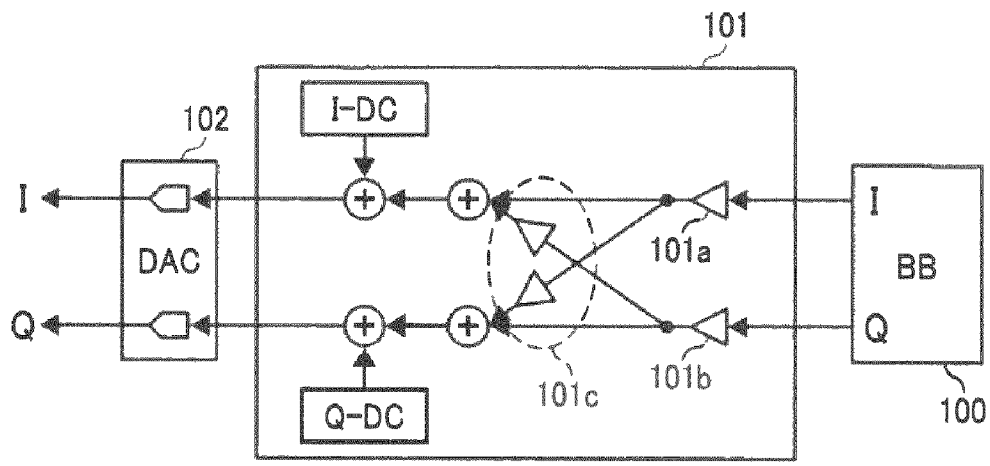
FIG. 1 is a schematic block diagram illustrating a background digital circuit for correcting the IQ quadrature errors provided at a transmitter side.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

For the descriptive purpose, a wireless communication system is explained according to an example embodiment of the present invention. Alternatively, a communication device of the present invention may be implemented as a wired communication system.

Figure 3:
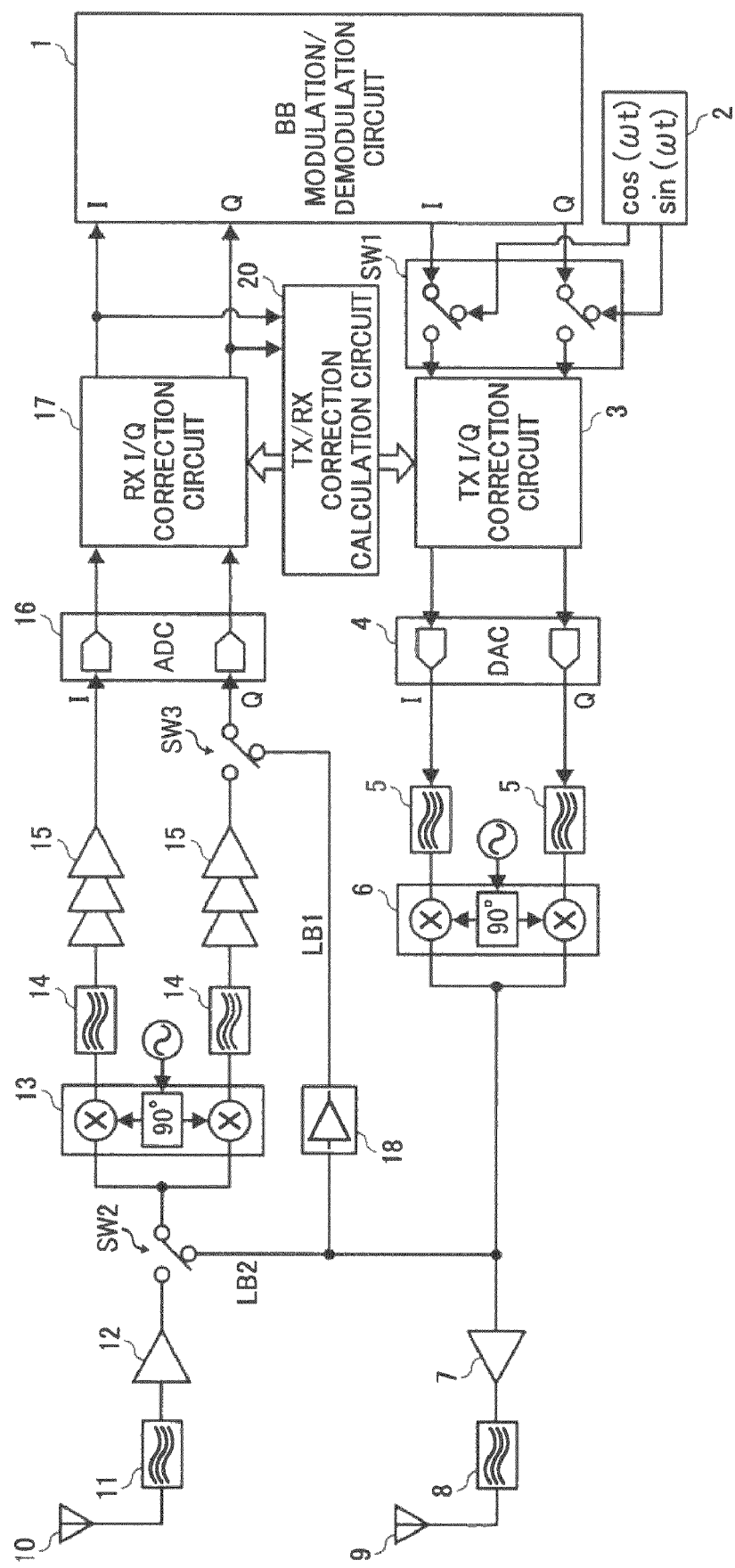
FIG. 3 is a schematic block diagram illustrating a structure of a wireless communication device according to an example embodiment of the present invention.

Referring to FIG. 3, a structure of a wireless communication device is explained according to an example embodiment of the present invention. The wireless communication device of FIG. 3 is provided with a baseband part, which includes a baseband ("BB") modulation/demodulation circuit 1, and a reference signal generator 2. When communicating with the outside, the BB modulation/demodulation circuit 1 modulates a baseband signal to generate data to be transmitted to the outside or demodulates data received from the outside into the baseband signal. The reference signal generator 2 generates a reference signal, which is used for correcting the quadrature errors of the IQ signals.

Assuming that the wireless communication device of FIG. 1 utilizes the OFDM as a modulation method, the BB modulation/demodulation circuit 1 incorporates therein an OFDM modulation/demodulation circuit having a Fast Fourier Transform (FFT) circuit.

The baseband part of the wireless communication device of FIG. 1 further includes a transmitter (TX) I/Q correction circuit 3, a digital analog converter (DAC) 4, an analog digital converter (ADC) 16, and a receiver (RX) I/Q correction circuit 17. The TX I/Q correction circuit 3 corrects the quadrature errors of the baseband IQ signals for transmission to output the corrected IQ signals. The DAC 4 converts the corrected IQ signals from digital to analog. The ADC 16 converts the received baseband signals from analog to digital. The RX I/Q correction circuit 17 corrects the quadrature errors of the IQ signals output from the ADC 16.

The wireless communication device of FIG. 1 is further provided with a transmitter analog part, which includes a low-pass filter (LPF) 5, a voltage controlled oscillator (VCO)/mixer 6, a power amplifier (PA) 7, a band-pass filter 8, and an antenna 9. The VCO/mixer 6 generates local signals having the in-phase and quadrature-phase components, modulates the baseband I and Q signals for transmission using the local signals, and upconverts the baseband I/Q signals to the RF signal. The PA 7 amplifies the RF signal. The antenna 9 outputs the RF signal into the air as an electric wave. Further, the wireless communication device of FIG. 1 is provided with a first switch SW1 between the BB modulation/demodulation circuit 1 and the TX I/Q correction circuit 3.

The wireless communication device of FIG. 1 is provided with a receiver analog part, which includes an antenna 10, a band-pass filter (BPF) 11, a low noise amplifier (LNA) 12, a VCO/mixer 13, a low pass filter (LPF) 14, and a variable gain amplifier (VGA) 15. The antenna 10 receives a modulation signal from the counterpart device as an electric wave. The LNA 12 amplifiers the received modulation signal. The VCO/mixer 13 generates local signals having the in-phase and quadrature-phase components, and downconverts the received I and Q signals using the local signals. The LPF 14 includes one LPF for each one of the I and Q signals. The LPF 14 removes the high-frequency components from the I and Q signals to output the baseband signals.

Still referring to FIG. 1, the wireless communication device of FIG. 1 is provided with a second switch SW2, a third switch SW3, and a power detector 18.

Figure 2:
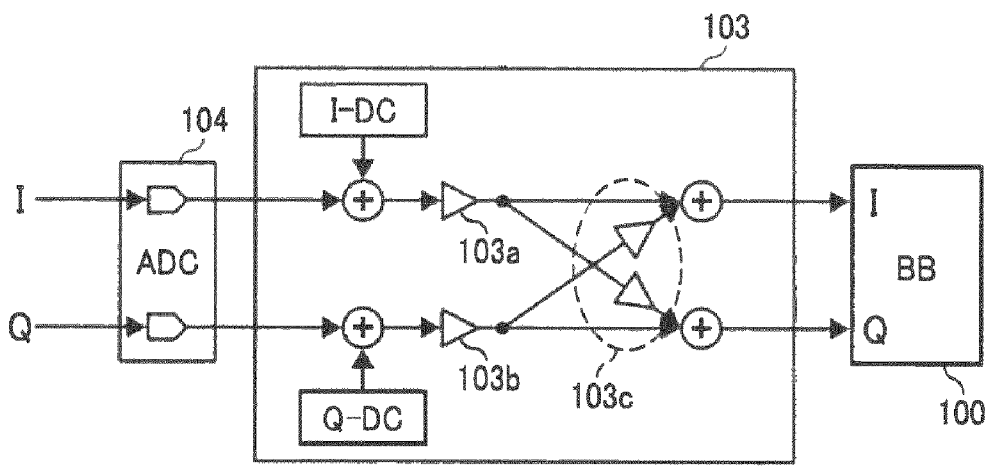
FIG. 2 is a schematic block diagram illustrating a background digital circuit for correcting the IQ quadrature errors provided at a receiver side.

Further, in this example, the TX I/Q correction circuit 3 is substantially similar in function and structure to the transmitter system of FIG. 1. The RX I/Q correction circuit 17 is substantially similar in function and structure to the receiver system of FIG. 2.

The structure of the wireless communication device is not limited to the example case illustrated in FIG. 1. For example, the wireless communication device may be provided with a single antenna that operates according to the on or off signal of a switch that may be optically provided. The switch switches between the transmitter path and the receiver path through switching the input or output of the antenna.

Alternatively, the wireless communication device of FIG. 1 does not have to transmit or receive the modulation signal through the antenna. For example, the wireless communication device of FIG. 1 may cause a transfer signal having a predetermined frequency to carry out the modulation signal, which is transmitted or received through a communication cable via a connector. In such case, the wireless communication device of FIG. 1 functions as a wired communication device such that the antenna 9 or 10 is not necessary.

Further, since it would be very rare for the wireless communication system to concurrently process operation of transmitting and receiving, a part of the RX I/Q correction circuit 17 and a part of the TX I/Q correction circuit 3 that are substantially similar in function and structure may be made common. In such case, the wireless communication device of FIG. 1 may switch between the transmitter circuit part and the receiver circuit part by changing correction coefficients or parameters such as gain.

In addition to the TX I/Q correction circuit 3 and the RX I/Q correction circuit 17, which are substantially similar in function and structure to the correction circuits described above referring to FIGS. 1 and 2, the wireless communication device of FIG. 1 is additionally provided with a TX/RX correction calculation circuit 20. The TX/RX correction calculation circuit 20 determines a correction parameter to be used by the TX I/Q correction circuit 3 and/or the RX I/Q correction circuit 17 so as to suppress the IQ quadrature errors in the wireless communication device of FIG. 1.

Referring to FIGS. 4 to 8, operation of correcting the IQ signal quadrature errors at the transmitter side is explained according to an example embodiment of the present invention. As described above referring to FIG. 3, the baseband part at the transmitter side includes the reference signal generator 2. In order to correct the IQ signal quadrature errors, the first switch SW1 is switched to connect the reference signal generator 2 with the TX I/Q correction circuit 3. The reference signal generator 2 generates a single tone having samples of a cosine wave, and a single tone having samples of a sine wave. The cosine wave single tone is output to the I side, while the sine wave single tone is output to the Q side. The single tones each have the same frequency, which is selected from one of the Discrete Fourier Transform (DFT) frequency bins. For example, assuming that the sampling frequency is 40 MHz and FFT is 64 points, the frequency bins have the minimum frequency of 0.625 MHz. In such case, the fourth frequency bin of 2.5 MHz, which is obtained by multiplying 0.625 MHz with 4, may be used as the reference frequency of the single tone. In this example, the reference signal generator 2 may determine the value of the signal by referring to a table previously stored in the communication device or accessible by the communication device.

At first, the TX I/Q correction circuit 3 is not set with any correction value. For this reason, the transmitter analog part including the LPF 5 and the VCO/mixer 6 quadrature modulates the reference signal output from the DAC 4, and upconverts it to the RF band signal. More specifically, the transmitter mixer 6 upconverts the baseband signals to the RF signal using the local signals respectively generated for the I components and the Q components.

The power detector 18 extracts the power envelope components from the upconverted RF signal. The extracted power envelope signal is input to either I or Q side of the ADC 16 as samples, and further input to the correction calculation circuit 20 through the RX I/Q correction circuit 17. In such case, the third switch SW3 is switched so as to connect the power detector 18 and the ADC 16 to form a loop back circuit LB 1. Since the correction parameter is not set, the RX I/Q correction circuit 17 just passes through the signal received from the ADC 16 to the correction calculation circuit 20.

The power envelope signal input to the RX I/Q correction circuit 17 through either one of the I or Q side, may have been influenced by the IQ signal quadrature errors caused in the transmitter analog part. For example, when the DC offset error components are introduced due to the DC offset, the frequency of 2.5 MHz that is equal to the reference frequency may appear. When the IQ gain or phase error components are introduced, the tone having the frequency of about 5 MHz, which is about twice of the reference signal, may appear.

Figure 4:
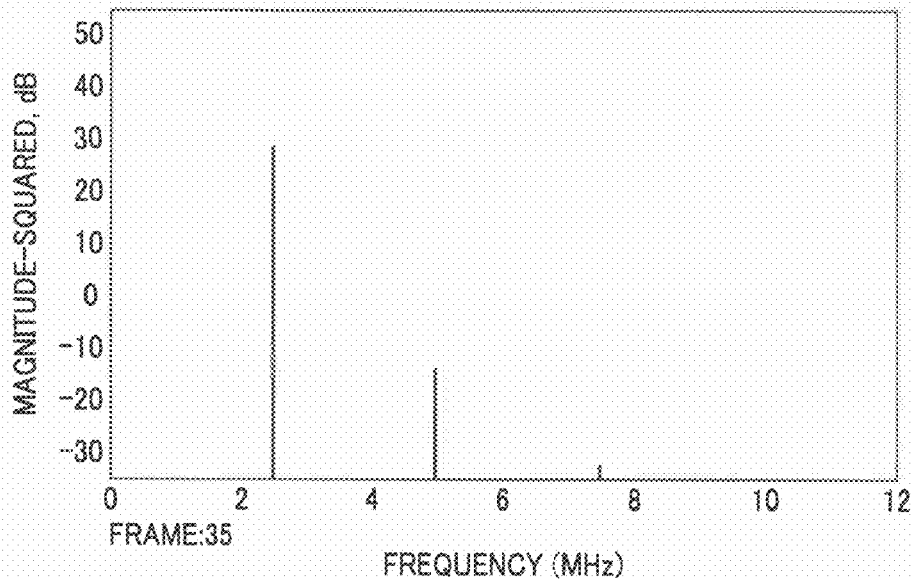
FIG. 4 is an illustration for explaining a power envelope signal before correcting the IQ quadrature errors.

FIG. 4 is a graph illustrating the power envelope signal that is influenced by the IQ signal quadrature errors. In order to suppress this negative influence, the IQ signal quadrature errors need to be compensated at the TX I/Q correction circuit 3. As described above referring to FIG. 1, the I and Q signals are corrected using the gain correction coefficient, phase correction coefficient, and DC components. These coefficients are determined by the correction calculation circuit 20.

Figure 5:
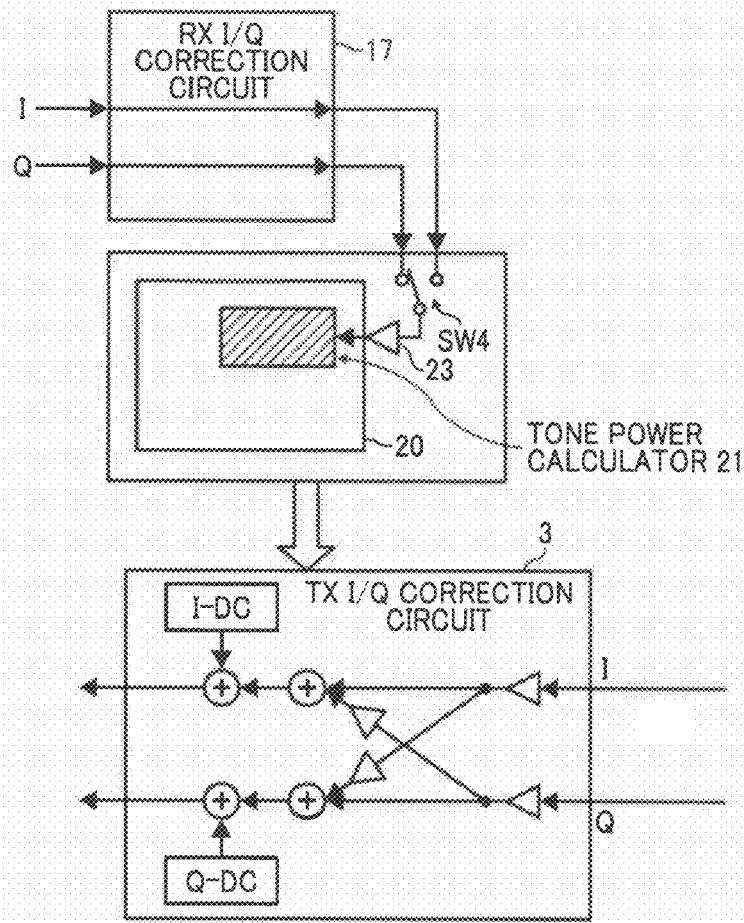
FIG. 5 is a schematic block diagram illustrating a structure of a correction calculation circuit of the wireless communication apparatus of FIG. 1 when the wireless communication apparatus of FIG. 1 functions as a transmitter system.

FIG. 5 illustrates the connection between the correction calculation circuit 20 and the RX I/Q correction circuit 17 when the correction calculation circuit 20 performs correction for the transmitter side. Referring to FIG. 5, the correction calculation circuit 20 is provided with a toner power calculator 21. The toner power calculator 21 has a partial Fourier transformation circuit, which calculates a single one of DFT frequency bins using the Goertzel algorithm.

As described above, the correction calculation circuit 20 is input with the power envelope signal from the I or Q side of the RX I/Q correction circuit 17. The switch SW 4 is switched between the path of inputting through the I side and the path of inputting through the Q side.

The tone power calculator 21 of the correction calculation circuit 20 calculates the power of the signal component having the same frequency f1 (2.5 MHz) as the reference signal, and the power of the signal component having the frequency f2 (5 MHx) twice of that of the reference signal, based on the power envelope signal. The tone power calculator 21 may be implemented by a partial Fourier transformation circuit, which is specially designed to perform calculation of the power values of one of the frequency bins of the DFT. The correction value is determined such that these tone power values calculated by the partial Fourier transformation circuit of the tone power calculator 21 are made minimum. The correction calculation circuit 20 determines a value of the DC component for the TX I/Q correction circuit 3, which causes the 2.5 MHz tone power to be minimum when added with the I and Q components of the reference signal, and inputs the value of the DC component to the TX I/Q correction circuit 3. The correction calculation circuit 20 changes the value of the partial Fourier transformation circuit to a value for 5 MHz, determines a correction value that causes the IQ gain or phase errors to be minimum, or the 5 MHz toner power to be minimum, and inputs the determined correction value to the TX I/Q correction circuit 3.

FIG. 6A illustrates a structure of the partial Fourier transformation circuit of the tone power calculator 21 of FIG. 5. FIG. 6B illustrates a transmission function performed by the partial Fourier transformation circuit of FIG. 6A, where fi is the frequency of interest and fs is the sampling frequency. FIG. 7 is an illustration for explaining the frequency-power characteristics calculated by the partial Fourier transformation circuit of FIG. 6A.

Since the respective frequency bins for the partial Fourier transformation circuit are orthogonal with each other, 5 MHz frequency components do not appear as the calculated power result when calculating the power for 2.5 MHz. Even when the input signal is distorted to cause generation of high frequency components having, for example, a multiple of the reference frequency, the calculated power result of the frequency bin does not show any influence attributable to the high frequency components. This implies that the power is distributed due to distortion.

In order to check whether the power is distributed, the correction calculation circuit 20 may be additionally provided with a total power calculator 22, which calculates the total power of the signal that is looped back. The total power calculator 22 is provided with a function of changing a value to be input to the multiplier of the partial Fourier transformation circuit of the toner power calculator 21 such that the frequency value of a frequency bin subjected for tone detection can be changed. More specifically, based on information specifying the subjected or selected frequency bin, the total power calculator 22 refers to a table to obtain a coefficient of the multiplier that corresponds to the subjected frequency bin, and changes the coefficient of the multiplier by inputting the coefficient to the multiplier of the toner power calculator 21. The partial Fourier transformation circuit of the tone power calculator 21 is then able to calculate the frequency power of each DFT bin. Based on the ratio between the total power and the tone power of each frequency bin, degradation in SNR attributable to the high frequency wave components caused in the analog part by the distorted input signal is determined.

Figure 8A:
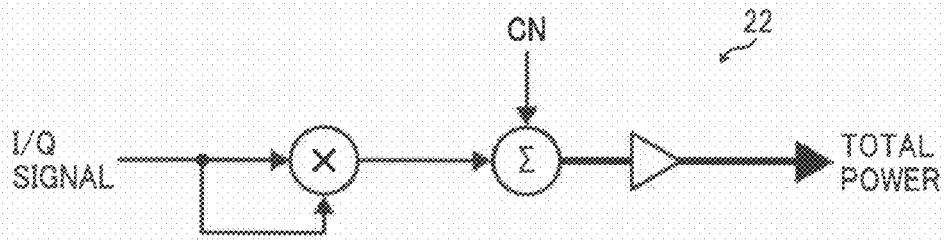
FIG. 8A is a circuit diagram illustrating a circuit structure of a total power calculator provided in the correction calculation circuit of FIG. 5.

In one example, the total power calculator 22 has a circuit structure illustrated in FIG. 8A. Referring to FIG. 8A, the I or Q signal is input to the total power calculator 22. The total power calculator 22 includes a multiplier that calculates the squared value of the input signal, and a cumulative number obtainer that obtains the total power of the squared value of the input signal for a predetermined time period specified by a cumulative number CN. The total power calculator 22 includes a normalized gain.

Figure 8B:
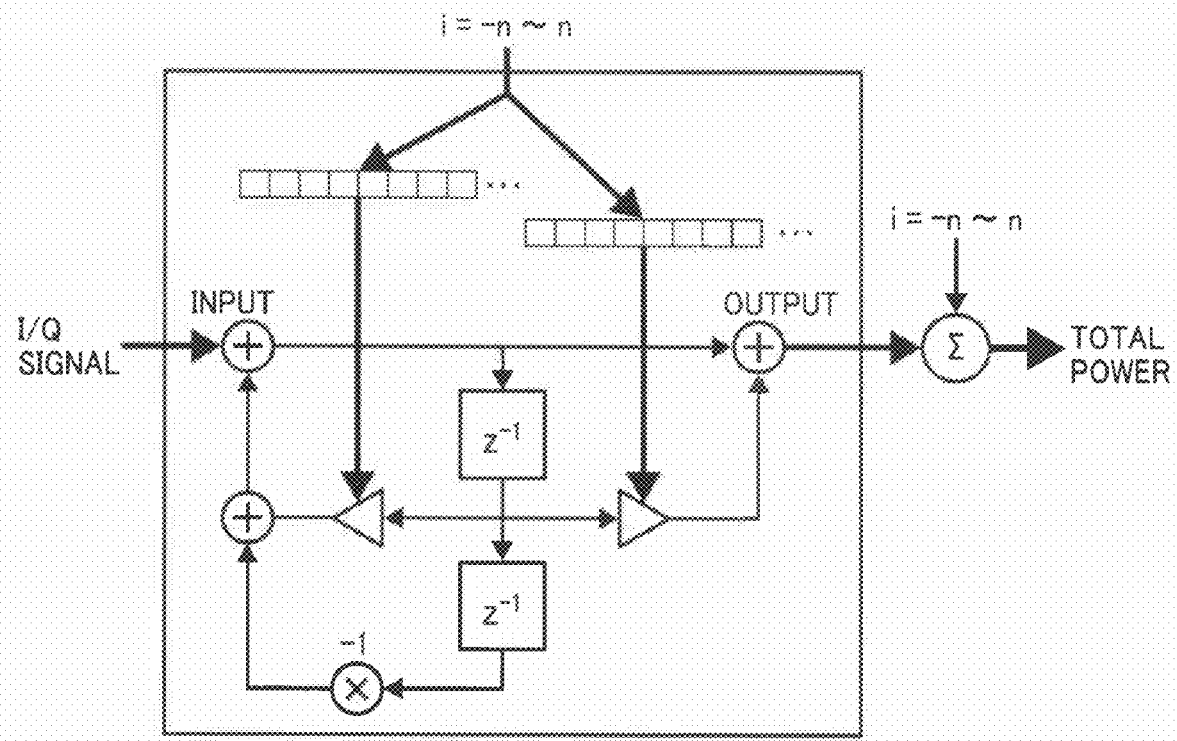
FIG. 8B is a circuit diagram illustrating a circuit structure of a total power calculator provided in the correction calculation circuit of FIG. 5.

In another example, the total power calculator 22 has a circuit structure illustrated in FIG. 8B, which is connected to the partial Fourier transformation circuit of the tone power calculator 21 of FIG. 6A. The total power calculator 22 is input with an output signal from the partial Fourier transformation circuit 21 of FIG. 6A, and calculates the total power of all frequency bins by adding the values of the output signal respectively output from the total power calculator 22. Referring to FIG. 8B, the total power calculator 22 changes a frequency bin subjected for detection by inputting a coefficient of the multiplier that corresponds to the frequency bin subjected for detection.

Such determination whether the input signal is distorted is preferably performed before obtaining a correction value. When it is determined that the input signal is distorted, an attenuator is provided to the loop back circuit LB1 of the analog part of FIG. 3, for example, between the power detector 18 and the third switch SW3.

When the signal that is looped back in the analog part exceeds the input full scale level of the ADC 16, the internal calculation cannot be performed in a manner by increasing the internal computation accuracy more than needed to suppress the occurrence of overflow. In such case, an amplitude adjustment circuit 23 is provided, which controls input scaling, as illustrated in FIG. 5. With the amplitude adjustment circuit 23, distortion due to the overflow is removed such that the signal input from the ADC 16 is made at the optimum input level after correction. For example, referring to FIG. 5, the amplitude adjustment circuit 23 may be additionally provided between the tone power calculator 21 and the switch SW4. The amplitude adjustment circuit 23 applies scaling to the input signal input to the partial Fourier transformation circuit of the tone power calculator 21 to prevent overflow of an internal computation circuit of the toner power calculator 21.

In this example, in case the baseband modulation/demodulation circuit 1 of the baseband part is provided with the FFT circuit designed for OFDM modulation/demodulation circuit ("the internal FFT circuit"), such internal FFT circuit is not used. Instead, the partial Fourier transformation circuit designed for calculation of one of frequency bins is provided on the correction calculation circuit 20 as illustrated in FIG. 5. The partial Fourier transformation circuit, in this example, may be referred to as a partial DFT circuit. As described above, the internal FFT circuit provided in the baseband modulation/demodulation circuit 1 has the computation power that is determined based on the secondary modulation method for OFDM modulation. In order to reduce the manufacturing cost and electric power consumption, the internal FFT circuit is designed to have the minimum computation power that is required for secondary modulation or data transmission/reception.

On the other hand, the computation accuracy that is required for calculating the power of the image signal caused due to quadrature errors should be set higher than the computation accuracy required for data transmission/reception. Generally, the computation accuracy that is greater than about 10 dB is required for correcting the quadrature errors when compared with the computation accuracy required for data transmission/reception. In order to calculate the power of the image signal used for correction of quadrature errors, in this example, a partial Fourier transformation circuit is provided in addition to the internal FFT circuit. The partial Fourier transformation circuit is capable of analyzing the frequency with higher accuracy than the internal FFT circuit. Further, the partial Fourier transformation circuit is small in circuit size than a generally provided FFT circuit such as the internal FFT circuit. For this reason, that the overall circuit size is kept relatively small when compared with the case of providing the generally provided FFT circuit in addition to the internal FFT circuit.

After performing corrections, the corrected parameters are set in the RX I/Q correction circuit 17 such that the IQ quadrature errors are suppressed.

Figure 9:
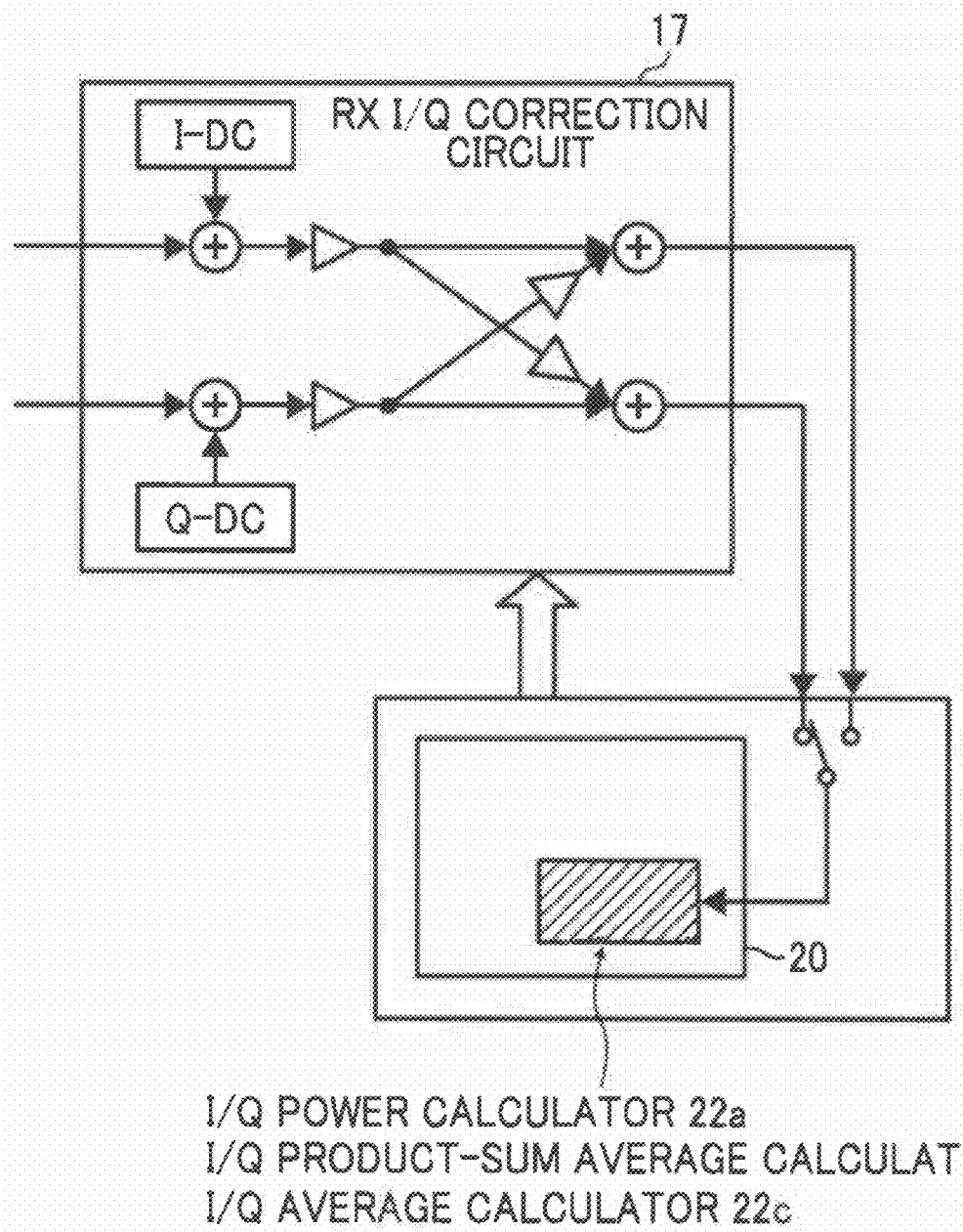
FIG. 9 is a schematic block diagram illustrating a structure of a correction calculation circuit of the wireless communication apparatus of FIG. 1 when the wireless communication apparatus of FIG. 1 functions as a receiver system.

Referring now to FIG. 9, a structure of the correction calculation circuit 20 is explained when the correction calculation circuit 20 is provided at the receiver side.

After performing correction of quadrature errors at the analog part of the transmitter side, quadrature errors at the analog part of the receiver side is corrected.

The switch SW2 of FIG. 3 is switched so as to connect the receiver path and the transmitter path. The switch SW3 is switched so as to disconnect the power detector 18 from the ADC 16, and connect the power detector 18 to the VGA 15 to form a second loop back circuit LB2. With this circuit structure, the reference signal that is corrected for IQ quadrature errors is looped back to the analog part of the receiver side. Based on the corrected reference signal, a correction parameter is calculated which is used for correcting quadrature errors of the analog part (VCO/Mixer 13, LPF 14, VGA 15) of the receiver side. The average value of the I/Q signals is calculated to obtain the DC offset value. The I/Q gain errors are corrected such that the power of the I/Q signals are made equal to each other. By averaging the product sum of the I/Q signals, the IQ phase errors can be corrected.

Figure 10A:
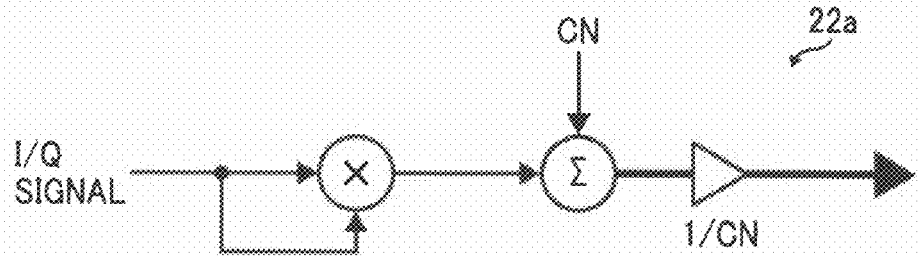
FIG. 10A is a circuit diagram illustrating a circuit structure of an I/Q calculator provided in the correction calculator circuit of FIG. 9.
Figure 10B:
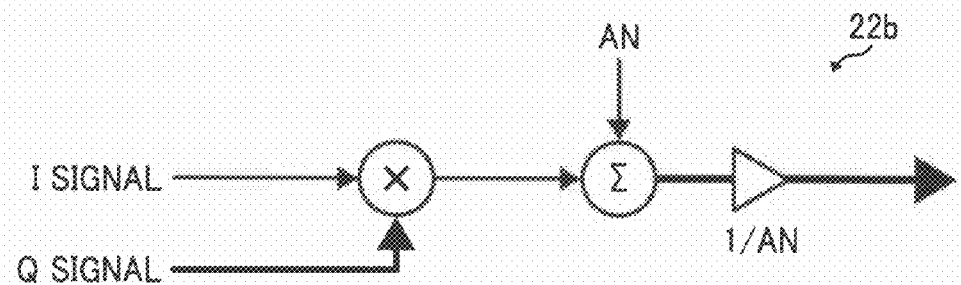
FIG. 10B is a circuit diagram illustrating a circuit structure of an I/Q product-sum average calculator provided in the correction calculator circuit of FIG. 9.
Figure 10C:
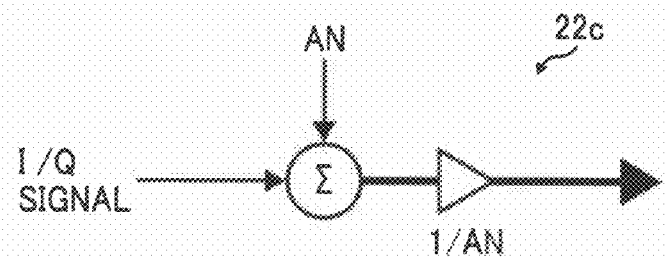
FIG. 10C is a circuit diagram illustrating a circuit structure of an I/Q average calculator provided in the correction calculator circuit of FIG. 9.

More specifically, as illustrated in FIG. 9, the correction calculation circuit 20 is provided with an I/Q power calculator 22a, an I/Q product-sum average calculator 22b, and an I/Q average calculator 22c. The I/Q calculator 22a, the UQ product-sum average calculator 22b, and the I/Q average calculator 22c respectively have a circuit structure of FIGS. 10A, 10B, and 10C. In FIGS. 10A, 10B, and 10C, CN refers to a cumulative number, and AN refers to an average number.

The I/Q power calculator 22a adjusts the IQ gain correction gain such that the squared values of the I and Q components of the signal are made equal to each other, thus correcting the IQ gain errors at the receiver side. In FIG. 10A, the I/Q power calculator 22a includes a multiplier that calculates the squared values of the UQ components.

The I/Q product-sum average calculator 22b obtains the power average sum of the I and Q components of the signal, and adjusts the phase correction gain such that the average value reaches 0. In FIG. 10B, the UQ product-sum average calculator 22b includes a multiplier that calculates the squared values of the I/Q components.

The I/Q average calculator 22c calculates the average value of the I and Q components of the signal to obtain the DC offset value.

The correction calculation circuit 20 inputs a correction parameter that is obtained based on the calculated values of the correction calculation circuit 20 to the receiver correction circuit 17. Based on the correction parameter, the receiver correction circuit 17 at the receiver side corrects the IQ quadrature errors caused in the receiver side analog part.

In this example, the multiplier is used at the receiver side for calculation of the power. Since the IQ quadrature error correction does not have to be performed concurrently for the transmitter side and the receiver side, the multiplier may be provided which may be commonly used for the transmitter side and for the receiver side, thus reducing the overall circuit size. For example, the correction calculation circuit 20 may be provided with at least one multiplier, which functions as at least one multiplier of the partial Fourier transformation circuit when correcting the quadrature errors caused in the transmitter side, and functions as at least one multiplier of the I/Q power calculator 22a when correcting the quadrature errors caused in the receiver side.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, the communication device of FIG. 3 may be incorporated into any desired apparatus, for example, an image forming apparatus such as a printer or a multifunctional apparatus capable of performing a plurality of image processing functions.

In one example, the present invention may reside in a communication device including: a baseband part including a modulation/demodulation circuit configured to modulate a baseband signal to be transmitted or demodulate a baseband signal that is received; and an analog part connected to the baseband part via an analog digital converter that converts the received baseband signal from analog to digital and a digital analog converter that converts the baseband signal to be transmitted from digital to analog, the analog part including a transmission side quadrature modulator that quadrature modulates the baseband signal to be transmitted and a receiver side quadrature modulator that quadrature modulates the received baseband signal. The baseband part further includes a correction circuit to correct quadrature errors caused in the analog part; a correction calculator to control a parameter of the correction circuit; a reference signal generator to supply I and Q signals of a single tone having a phase difference of 90 degrees and the same frequency as a reference signal to the correction circuit; a power detector to extract a power envelop signal from the reference signal that is quadrature modulated by the transmitter side quadrature modulator and up-converted; a loop back path circuit to input the power envelop signal via the analog digital converter to the baseband part. The correction calculator includes a tone power calculator including a partial Fourier transformation circuit that calculates the power of a signal component having the same frequency with the reference signal from the power envelop signal input via the analog digital converter, and the power of a signal component having a frequency twice of the frequency of the reference signal, obtains a value of the correction parameter to make the values of the powers to be minimum, and inputs the obtained value of the correction parameter to the correction circuit so as to correct quadrature errors caused in the transmitter side analog part.

In another example, the modulation/demodulation circuit includes an OFDM modulation/demodulation circuit implemented by a Fast Fourier transformation circuit, and the partial Fourier transformation circuit is set to have a computation accuracy higher than a computation accuracy required for the OFDM modulation/demodulation circuit.

In another example, the tone power calculator further includes a total power calculator that calculates the total power of the power envelop signal looped back to detect distortion caused in the analog part; and a frequency bin changing function that changes a frequency value of a frequency bin for tone detection by changing a coefficient input to an multiplier of the partial Fourier transformation circuit. The tone power calculator obtains the frequency power for each one of the frequency bins from the partial Fourier transformation circuit, and detects distortion of high frequency components caused in the analog part based on the ratio of the total power with respect to each frequency bin.

In another example, the communication device includes an amplification adjustment circuit to apply scaling to the input signal input from the analog digital converter to the baseband part before the input signal is input to the correction circuit.

In another example, the communication device further includes a second loop-back path at the receiver side analog part to input the corrected reference signal in which quadrature errors caused in the transmitter side analog part are corrected to the receiver side modulation/demodulation circuit to correct quadrature errors caused in the receiver side analog part. The correction calculator circuit further includes: an I/Q power calculator circuit configured to calculate the power of the I/Q components of the corrected reference signal that passes the receiver side analog part and the analog digital converter; an I/Q product-sum average calculator circuit configured to calculate the product-sum average of the IQ signals; and an I/Q average calculator circuit configured to calculate the average of I/Q signals. The correction parameter is controlled based on the calculated values.

In another example, a multiplier may be provided in the correction calculator circuit, which functions as a multiplier of the I/Q power calculator and a multiplier of the partial Fourier transformation circuit. In such case, the number of multipliers is not limited to one.

What is claimed is:

1. A communication device, comprising:
a digital baseband circuit configured to modulate a baseband signal to be transmitted to the outside and demodulate a baseband signal received from the outside;
a transmitter side analog circuit connected to the digital baseband circuit via a digital analog converter and including a transmission side quadrature modulator that quadrature modulates the baseband signal received from the digital baseband circuit to output an up-converted signal to be transmitted to the outside;
a receiver side analog circuit connected to the digital baseband circuit via an analog digital converter and including a receiver side quadrature modulator that quadrature modulates a signal received from the outside to output the baseband signal to the digital baseband circuit; and
a first loop back path circuit provided between the transmitter side analog circuit and the analog digital converter,
wherein the digital baseband circuit includes:
a reference signal generator configured to generate a reference signal including I signal and Q signal of a single tone that are different in phase by 90 degrees;
a transmitter side correction circuit provided between the reference signal generator and the transmitter side analog circuit and configured to correct quadrature errors caused in the transmitter side analog circuit; and
a correction calculator circuit provided between the analog digital converter and the transmitter side correction circuit and including a tone power calculator circuit that obtains a power envelope signal extracted from the reference signal that is quadrature modulated by the transmitter side quadrature modulator through the first loop back path circuit, calculates a correction parameter of the transmitter side correction circuit based on the extracted power envelope signal, and inputs the calculated correction parameter to the transmitter side correction circuit to correct quadrature errors,
the tone power calculator circuit including:
a partial Fourier transformation circuit programmed to calculate the power of a single one of frequency bins at a time to obtain the power of a signal component having the same frequency with the reference signal from the power envelope signal and the power of a signal component having a frequency twice the frequency of the reference signal, and the correction parameter calculated by the tone power calculator circuit is a value that minimizes the values of the powers obtained by the partial Fourier transformation circuit.

2. The communication device of claim 1, wherein the digital baseband circuit includes an OFDM ("Orthogonal Frequency Division Multiplexing") modulation/demodulation circuit implemented by a Fast Fourier transformation circuit, and the partial Fourier transformation circuit of the tone power calculator circuit is set to have a computation accuracy higher than a computation accuracy required for the OFDM modulation/demodulation circuit.

3. The communication device of claim 2, wherein the partial Fourier transformation circuit includes a multiplier, and the tone power calculator circuit is configured to change a coefficient of the multiplier of the partial Fourier transformation circuit to change a value of the single frequency bin to be calculated by the partial Fourier transformation circuit.

4. The communication device of claim 3, wherein the tone power calculator circuit further includes:
 a total power calculator circuit connected to the partial Fourier transformation circuit and configured to calculate the total power of the power envelope signal using the power calculated by the partial Fourier transformation circuit for each one of the frequency bins, and to determine whether distortion in high frequency signal components is caused in the transmitter side analog circuit based on a ratio of the total power to the power of each one of the frequency bins.

5. The communication device of claim 4, wherein the tone power calculator circuit further includes:
 an amplification adjustment circuit provided between the analog digital converter and the transmitter side correction circuit and configured to apply scaling to the signal input from the analog digital converter and input the scaled signal to the transmitter side correction circuit to correct distortion in high frequency signal components.

6. The communication device of claim 4, further comprising:
 a receiver side correction circuit provided between the digital baseband circuit and the receiver side analog circuit and configured to correct quadrature errors caused in the receiver side analog circuit;
 a second loop back path circuit provided between the receiver side analog circuit and the transmitter side analog circuit and configured to input a corrected reference signal in which quadrature errors caused in the transmitter side analog circuit are corrected to the receiver side correction circuit via the analog digital converter, wherein the correction calculator circuit further includes:
 an I/Q power calculator circuit configured to calculate the power of the I and Q components of the corrected reference signal;
 an I/Q product-sum average calculator circuit configured to calculate the product-sum average of the I and Q components of the corrected reference signal; and
 an I/Q average calculator circuit configured to calculate the average of I and Q components of the corrected reference signal,
 wherein the correction calculator circuit calculates a correction parameter of the receiver side correction circuit that corrects quadrature errors caused in the receiver side analog circuit using at least one of the I/Q power calculator circuit, the I/Q product-sum average calculator circuit, and the I/Q average calculator circuit, and inputs the calculated correction parameter value to the receiver side correction circuit.

7. The communication device of claim 6, wherein the multiplier of the partial Fourier transformation circuit functions as a multiplier of the I/Q power calculator circuit.

8. A communication system comprising the communication device of claim 1.

* * * * *